(12) United States Patent
Ho

(10) Patent No.: US 10,353,572 B2
(45) Date of Patent: Jul. 16, 2019

(54) TICKETING MACHINE ON A WALL

(71) Applicant: Cubic Corporation, San Diego, CA (US)

(72) Inventor: Patrick Ho, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 15/835,794

(22) Filed: Dec. 8, 2017

(65) Prior Publication Data

US 2018/0164976 A1      Jun. 14, 2018

Related U.S. Application Data

(60) Provisional application No. 62/431,728, filed on Dec. 8, 2016.

(51) Int. Cl.
*G06F 3/0488* (2013.01)
*G07B 1/00* (2006.01)
(Continued)

(52) U.S. Cl.
CPC .......... *G06F 3/0488* (2013.01); *G06F 3/0426* (2013.01); *G07B 1/00* (2013.01); *G07B 5/00* (2013.01); *G06F 3/0304* (2013.01); *G06F 3/0421* (2013.01); *G06F 3/0425* (2013.01); *G06F 2203/0384* (2013.01); *G07F 17/42* (2013.01)

(58) Field of Classification Search
CPC .... G06F 3/0488; G06F 3/0426; G06F 3/0421; G06F 2203/0384; G06F 3/0425; G06F 3/0304; G07B 5/00; G07B 1/00; G07F 17/42

See application file for complete search history.

(56) References Cited

U.S. PATENT DOCUMENTS

| | | | |
|---|---|---|---|
| 2008/0192027 A1* | 8/2008 | Morrison | G06F 3/043 345/177 |
| 2012/0249422 A1* | 10/2012 | Tse | G06F 3/017 345/158 |

(Continued)

FOREIGN PATENT DOCUMENTS

| | | |
|---|---|---|
| WO | 2014201466 A1 | 6/2014 |
| WO | 2016073938 A1 | 11/2015 |

OTHER PUBLICATIONS

International Search Report and Written Opinion dated Mar. 6, 2018 for PCT/US2017/065265; 13 pages.

*Primary Examiner* — Rodney Amadiz
(74) *Attorney, Agent, or Firm* — Kilpatrick Townsend & Stockton LLP

(57) ABSTRACT

A ticketing machine on a wall includes an image projection device, a touch sensor, a wireless interface that is configured to communicate with a user's mobile device, and a processor. The processor is configured to project, using the projector, a graphical user interface of the ticketing machine on a surface and detect, using the touch sensor, a touch interaction of a user of the ticketing machine on the graphical user interface that is projected on the surface. The processor is further configured to determine a selection of an option of the user based on the detected touch interaction and provide, using the wireless interface, an entry product to a mobile device of the user based on the selected option.

16 Claims, 7 Drawing Sheets

(51) Int. Cl.
    *G06F 3/042*     (2006.01)
    *G07B 5/00*     (2006.01)
    *G06F 3/03*     (2006.01)
    *G07F 17/42*     (2006.01)

(56) References Cited

U.S. PATENT DOCUMENTS

| | | | |
|---|---|---|---|
| 2013/0030552 A1* | 1/2013 | Beckley | G05B 19/0423 |
| | | | 700/17 |
| 2013/0252691 A1 | 3/2013 | Alexopoulos | |
| 2014/0192089 A1* | 7/2014 | Honda | G06T 3/40 |
| | | | 345/661 |
| 2016/0132849 A1* | 5/2016 | Melo | H04L 65/60 |
| | | | 705/57 |
| 2016/0191868 A1* | 6/2016 | Fujiune | H04N 9/215 |
| | | | 348/759 |
| 2016/0202898 A1* | 7/2016 | Bostick | G06F 3/04883 |
| | | | 345/173 |

* cited by examiner

US 10,353,572 B2

TICKETING MACHINE ON A WALL

CROSS-REFERENCES TO RELATED APPLICATIONS

This application claims the benefit of U.S. Provisional Patent Application No. 62/431,728, filed Dec. 8, 2016, entitled "TICKETING MACHINE ON A WALL," the entirety of which is hereby incorporated by reference for all intents and purposes.

BACKGROUND OF THE INVENTION

Existing ticketing machines are typically bulky pieces of equipment that take up significant amounts of space and are associated with high equipment and maintenance costs. Due to the large space requirements, the addition of new devices in existing areas may be difficult, especially in high traffic areas such as transit stations where space may be limited. Such issues pose challenges when utilization exceeds current ticketing machine capabilities at a particular area and additional resources are needed. Additionally, existing ticketing machines provide fixed locations and user interfaces, limiting the accessibility of the ticketing machines for users of different heights, as well as the accessibility for users in wheelchairs.

BRIEF SUMMARY OF THE INVENTION

Embodiments of the invention provide techniques for operating ticketing machines that are projected or embedded within a wall or other partition. This allows virtually any surface to be converted into a ticketing machine, without the need for bulky equipment, and without the need to take up valuable floor space in crowded areas. Such devices may also allow for real-time height and position adjustments that make the ticketing interface more accessible for users of different sizes.

In one aspect, a ticketing machine on a wall is provided. The ticketing machine may include an image projection device, a touch sensor, a wireless interface that is configured to communicate with a user's mobile device (such as to provide tickets and other credentials or to receive payment data), and a processor. The processor may be configured to project, using the projector, a graphical user interface of the ticketing machine on a surface and detect, using the touch sensor, a touch interaction of a user of the ticketing machine on the graphical user interface that is projected on the surface. The processor may be further configured to determine a selection of an option of the user based on the detected touch interaction and provide, using the wireless interface, an entry product to a mobile device of the user based on the selected option.

In another aspect, a ticketing machine on a wall includes an image capture device, an image projection device, a touch sensor, a wireless interface that is configured to communicate with a user's mobile device, and a processor. The processor may be configured to detect, using the image capture device, a position of a user, project, using the projector, a graphical user interface of the ticketing machine on a surface, wherein a position of the graphical user interface is based on the detected position of the user, and detect, using the touch sensor, a touch interaction of a user of the ticketing machine on the graphical user interface that is projected on the surface. The processor may be further configured to determine a selection of an option of the user based on the detected touch interaction and provide, using the wireless interface, an entry product to a mobile device of the user based on the selected option.

In another aspect, a method for operating a ticketing machine on a wall is provided. The method may include projecting a graphical user interface of the ticketing machine on a surface and detecting a touch interaction of a user of the ticketing machine on the graphical user interface that is projected on the surface. The method may also include determining a selection of an option of the user based on the detected touch interaction and wirelessly providing an entry product to a mobile device of the user based on the selected option.

BRIEF DESCRIPTION OF THE DRAWINGS

A further understanding of the nature and advantages of various embodiments may be realized by reference to the following figures.

DETAILED DESCRIPTION OF THE INVENTION

Figure 1:
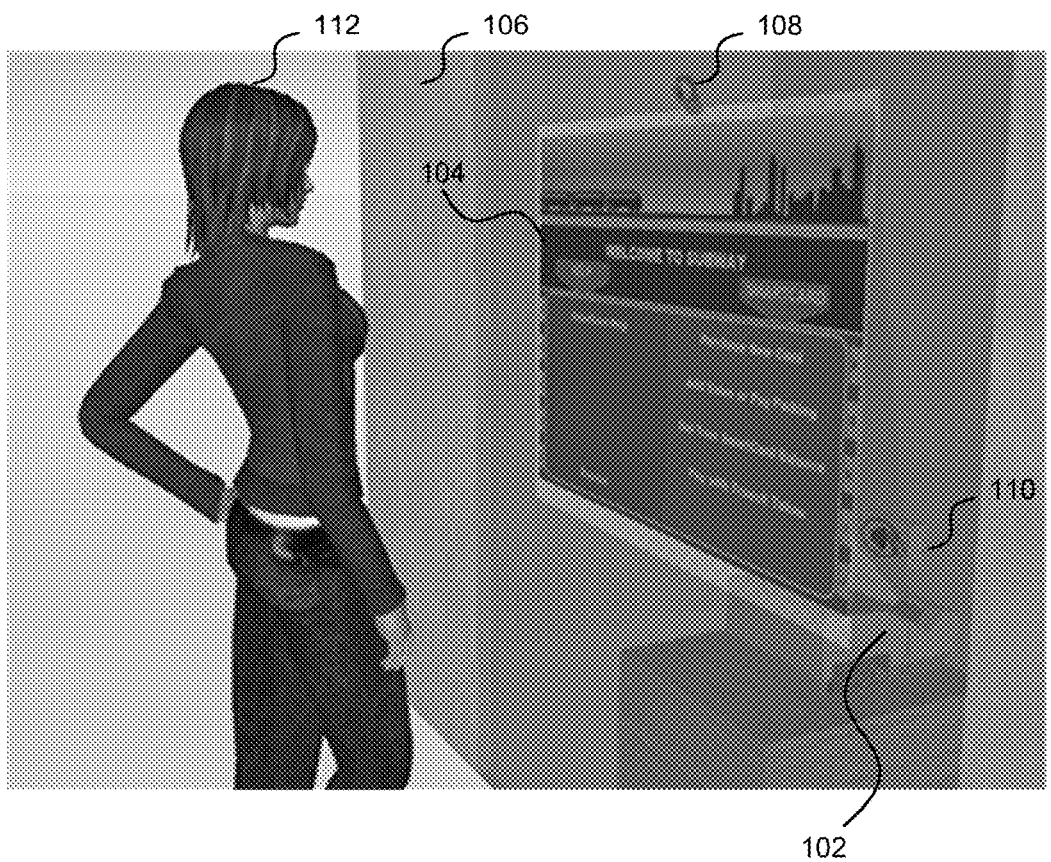
FIG. 1 depicts a front view of a ticketing machine on a wall according to embodiments.
Figure 1:
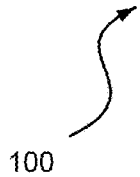

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention(s) described herein are generally related to public transit. It will be understood, however, that the applications for the invention(s) are not so limited. It may be applied, for example, to other applications where ticketing or other ticketing machines may be used, such as those that use contactless media.

Embodiments of the invention described herein enable the size of ticketing and other ticketing machines to be reduced. The invention describes methods that reduce equipment costs and maintenance costs. Embodiments of the invention described herein enable ticketing machines with all components behind a wall, leaving nothing outside on the surface. Such devices support all basic functionality of a ticketing machine. Embodiments include a graphical user interface and can accept payment, add products to fare media, and email receipts. Also, embodiments of the ticketing machines will enable the adjustment of a display position automatically based on the user's height, making itself accessible to people with different heights such as adults, youths, and people in wheelchairs.

Some embodiments of the invention may include a ticketing machine that will be installed behind a glass wall. By using various contactless technologies, even the payment device(s) and fare media reader(s) can be located behind the wall, leaving nothing outside. The ticketing machine will support a graphical user interface (GUI), payment, reading and writing to fare media, emailing receipts, adjusting display height, and the like.

Embodiments of the invention may enable a graphic display to be shown onto the wall from a projector. Alternatively, a flat panel display can be used. Embodiments may enable a touch sensitive sensor to be added to the interior side of glass wall. In some embodiments, the touch sensitive sensor can be a sheet of touch foil. In some embodiments, the touch sensitive sensor is almost completely transparent and can be easily adhered to the glass.

Embodiments of the invention may support contactless payment methods. For example, embodiments can have a Near Field Communication (NFC) credit card reader for contactless credit cards and NFC mobile payment. In some embodiments, the radio frequency (RF) field strength will be adjusted so that the reader can read cards/phones through the glass. Embodiments described herein may utilize contactless smartcards as fare media. Embodiments enable ticketing machines that can use the credit card reader mentioned above to read and write to contactless smart cards as well.

Embodiments of the invention enable ticketing machines to email receipts to a user's email address. In some embodiments, the email address on file can be associated with user's fare media or payment card. In some embodiments, a user can also enter an email address through the user interface.

Embodiments of the invention enable ticketing machines that detect a user's height and adjust position of user interface accordingly. This feature is particularly useful to users in wheelchairs. In some embodiments, the ticketing device can use a camera behind the glass or sensor(s) from the ceiling to determine a user's height. Embodiments of the invention enable ticketing machines to adjust position of graphic and buttons on the display. No moving of hardware will be needed.

The techniques described herein can provide any of a variety of novel aspects. For example, a ticketing machine may be provided with all components behind a glass wall, leaving nothing outside, not even a slot, while still capable of accepting payment and adding products to fare media. A position of a user interface of the ticket machine may be automatically adjusted, allowing the ticketing machine to be more accessible to a wide variety of users of different heights and/or users in wheelchairs.

Additionally, embodiments of the invention may offer one or more advantages including, for example, greatly reduced size of a ticketing machine, automatic adjustability of user interface position (which is particularly useful to users in wheelchairs), a modern looking exterior, reduced cost of equipment, much easier and cheaper to maintain the equipment (nothing outside on the surface, no moving parts inside, no cash container to replenish or replace), and/or the like. By offering a cashless solution to ticketing, less security is needed around the ticketing machines.

According to some embodiments, a ticket machine on a wall could be constructed using a glass wall that has a display and touch-sensitive elements embedded inside. According to some embodiments, additional contactless technologies may be supported for use as payment and/or fare media. For example, barcode, photonic, sound, network-based (local or wide area network), Bluetooth, and other RF technologies, and the like may be used for payment and/or fare media. According to some embodiments, a camera or other image capturing device may be used to read credit card number from a card to support magnetic credit cards as well.

In some embodiments, a ticket machine on a wall could be constructed by mounting all components on a wall, rather than putting everything behind a glass wall. With this approach, virtually any wall or existing surface may be retrofitted into a ticketing machine.

According to some embodiments, a ticketing machine can get user's "preferred display height" from either the user's smartphone wirelessly, or from the user's account online rather than adjusting vertical position based on user's height. According to some embodiments, a ticketing machine can detect a user's location, and display a GUI in front of the user (i.e. turn a whole wall into multiple ticketing machines, and display user interface at where a user is standing).

Turning now to FIG. 1, one embodiment of a ticketing machine 100 is shown. Ticketing machine 100 includes at least one image projection device 102 that may be configured to project a graphical user interface 104 of the ticketing machine 100 onto a surface 106, such as a wall, screen, window, and/or other partition. The image projection device 102 may produce still or moving images using optical light and/or lasers. In some embodiments, the image projection device 102 may be positioned entirely behind the surface 106. In such embodiments, the surface 106 may be formed from a transparent material, such as plastic or glass, that allows the image projection device 102 to project an image of the graphical user interface 104 from a position rearward of the surface 106, through the surface 106, such that the graphical user interface 104 is displayed on or through the front of surface 106. This allows the image projection device to be positioned entirely behind the surface 106, while still being able to project an image that is viewable to a user 112 standing on an opposite side of the surface 106.

Image projection device 102 may be any projection device that is capable of projecting at least one graphical user interface 104 onto a surface 106. In some embodiments, such as where image projection device 102 is configured to project the graphical user interface 104 through the rear of surface 106 such that the graphical user interface 104 is viewable from a front of surface 104, the image projection device 102 may be configured to project a reverse negative version of the graphical user interface 104 such that when viewed by the user 112, the graphical user interface 104 is oriented properly relative to the user 112. In some embodiments, the image projection device 102 may be configured to project a single graphical user interface 104 at a single location, while in other embodiments a single image projection device 102 may be configured to project multiple graphical user interfaces 104 at different locations on one or more surfaces.

Ticketing device may also include one or more position sensors 108, such as a camera, other image capture device, infrared position sensors, and/or other proximity sensors. Position sensors 108 may be used for multiple purposes. For example, the position sensors 108 may be used to detect the presence of a user 112 near the ticket machine 100. In some embodiments, this detection of a user may trigger the image projection device 102 to "wake up" and to project an initial screen of a graphical user interface 104 of the ticketing machine 100. In other embodiments, the image projection device 102 may be configured to project the graphical user interface 104 at all times. In other embodiments, a location on which to project the graphical user interface 104 may be determined using the position sensors 108. For example, the position sensors 108 may not only detect the presence of the user 112, but also a position of the user 112 relative to the surface 106 and/or image projection device 102. A processor (not shown) of the ticketing machine 100 may use the position information from the position sensor(s) to determine a position on the surface on which the image projection device 102 should project the graphical user interface 104. In some embodiments, especially in uncrowded areas, the position sensor(s) may be configured to continually track a position of one or more users 112 as they move along a walkway. This allows the processor to move the location of the graphical user interface 104 projected by the image projection device 102 to follow the moving user 112. Such moving graphical user interfaces 104 may not only draw additional attention to their presence, but may provide additional convenience to a user 112 who is trying to locate a ticketing machine 100 in a hurry.

In some embodiments, such as those where the position sensor(s) 108 include one or more image capture devices (still or video), the position sensor(s) 108 may also be configured to detect a height of the user 112 and/or a height of the user's face and/or eyes. This height data may be used by the processor of the ticketing machine 100 to adjust a vertical position of the graphical user interface 104 projected by the image projection device 102. This is particularly useful for making the ticketing machine 100 more accessible to user's in wheelchairs and other users that are height disadvantaged. For example, when a user 112 in a wheelchair is detected by the position sensor(s) 108 it may be determined that a height of the user's face and/or eyes are at a lower than normal height and a position of the graphical user interface 104 may be lowered to accommodate the needs of the user 112.

When position sensor(s) 108 include at least one image capture device, the image capture device may also be used to identify a particular user 112. For example, the image capture device may capture an image of the user's face. This image may be passed to the processor, which may compare the image (or a portion of the image) to facial recognition data store in a local and/or central database. If a match is found, the user's account information may be retrieved, including any ticketing machine preferences of the user, any records of previous purchases or products, and/or other information associated with the user 112.

In some embodiments, the position sensors 108 may include one or more radio frequency beacons, receivers, transmitters, and/or transceivers that are positioned near the surface 106. These beacons could be configured to detect the presence of nearby mobile devices. In some embodiments, the beacons may be positioned near the surface 106. A user's mobile device will transmit a beacon signal. The beacon receiver(s) will determine the distance. For example, the beacons may emit signals (such as Bluetooth LTE® signals) that may determine the presence of mobile devices in the area. Using a received signal strength indication (RSSI) of the communications with the mobile devices, the beacons may determine a distance of the mobile device from the surface 106 and use this information to determine where a particular user 112 is relative to the surface 106. In some embodiments, to remove the effects of bias from different models of mobile devices, cases, and the like, a difference in RSSI from multiple beacons may be used to triangulate the exact position of a mobile device. In other embodiments, beacon transmitter(s) may be positioned near the surface 106. A user's mobile device will receive a beacon signal, determine the distance by using the received RSSI, and then send the information back to a server via a wireless network (cellular/WiFi/Bluetooth). The advantage of this approach is better privacy. The user's mobile device will not be broadcasting data in the public. In other embodiments, the communication between the mobile device and the beacon may include data related to the radio frequency characteristics of the particular mobile device. This data may be used to determine an exact distance of the mobile device from the beacon without the use of additional beacons. In other embodiments, additional data from the user's account information and/or the user's current GPS location may be used to determine a location of the user relative to the surface 106.

The graphical user interface 104 may include a display showing a number of options to the user 112. For example, the graphical user interface 104 may provide one or more ticket options, a history of the user's interactions with the ticketing machine 100 (if the user has logged on or otherwise had their identity validated), information related to event times (sporting events, transit timetables, and the like), and/or other information related to the ticketing process. One or more icons may be associated with various information types on the graphical user interface 104. The user 112 may interact with one or more of these icons to navigate different screens and/or options of the graphical user interface 104. For example, the user 112 may be initially presented with a welcome screen of the graphical user interface 104. The user 112 may interact with an icon to select a particular event time for which to purchase a ticket. Upon selecting the event time, the user 112 may be presented with a second screen of the graphical user interface 104 that provides options related to the particular event time, such as ticket/fare type, location of a seat associated with the ticket, a quantity of tickets, and the like. The user 112 may make an additional selection of one or more of these options using the corresponding icon(s). The user 112 may then complete a purchase of the ticket(s).

In order to detect the user's interactions with the icon(s) of the graphical user interface 104, the ticketing machine 100 may include one or more touch sensors (not shown). Touch sensors may take a variety of forms. For example, in some embodiments, the touch sensors may include an infrared array that emits an infrared beam in front of the surface 106 and graphical user interface 104. The infrared array is configured to detect breaks in the beams, such as when a user 112 touches the surface 106 to interact with the graphical user interface 104. A position of each break may be determined and correlated with a position on the graphical user interface 104 to determine the intent of the interaction of the user 112. In other embodiments, such as those where the surface 106 is glass or plastic, the touch sensors may include a touch foil surface embedded in or mounted to the surface 106. The touch foil may be transparent. When a user 112 touches the surface 106, the touch foil may detect the contact and determine a location of the touch on the touch foil. This location information may be correlated to a position of the graphical user interface 104 to determine what action should be taken based on the touch. In other embodiments, the touch sensors may include one or more vibration sensors. Vibration sensors may often be installed at edges and/or corners of a surface 106 that is used as a substrate for the projected graphical user interface 104. For example, a glass window or wall may include vibration sensors embedded or otherwise coupled at edges and/or corners of the surface 106. When a user touches the surface 106, the contact creates tiny vibrations that propagate throughout the surface 106. As the vibrations reach the vibration sensors, the sensors may compare a direction and/or magnitude of the detected vibrations to those detected by the other vibration sensors to triangulate a position of the touch.

It will be appreciated that some embodiments may utilize multiple forms of touch sensors. Data from the various sensors may then be compared to determine whether a particular interaction with a user 112 was properly detected. For example, if an interaction detected at a particular location of the graphical user interface 104 using a touch foil surface matches an interaction detected at a corresponding location of an infrared array, the ticketing machine 100 may determine that the user interaction was proper and may navigate the graphical user interface accordingly.

In embodiments where the touch foil data does not match the data from the infrared array (including both when one sensor records a touch and the other sensor does not and situations where both sensors record a touch but the locations and/or timing of the touches do not match) the ticketing machine 100 may determine that the interaction was unintended, such as if a child touched multiple areas of the graphical user interface 104 at the same time, and choose to ignore the mismatched touch. Additionally, the ticketing machine 100 may determine such mismatch is due to a sensor error, such as an equipment failure or a sensor needing to be recalibrated. The ticketing machine 100 may ignore the mismatched touch and/or automatically call for a service technician, which may involve the ticketing machine 100 generating a service request and transmitting the service request over a network (public or secured, wired or wireless) to a remote device, thereby causing the request to display on a screen of the remote device. In some embodiments, an audible notification may also be produced. The request may be sent as a push notification to a mobile application, an email message, a short messaging service (SMS) message, TWITTER® message, and/or other electronic notification. In some embodiments, the mismatched touch may be detected multiple times. In such cases, the ticketing machine 100 may determine that it is malfunctioning and either cause an error message to the user 112 and/or attempt to determine the most likely intent of the interaction and proceed to advance the graphical user interface 104 accordingly.

The ticketing machine 100 may include a wireless interface 110. One or more wireless interfaces 110 may be positioned on, behind, or within the surface 106. In embodiments with multiple wireless interfaces 110, the interfaces 110 may be positioned at various positions and heights along the surface 106. This allows multiple locations to support graphical user interfaces 104. The wireless interface 110, which may operate using a WiFi, Bluetooth, near field communication (NFC), and/or other radio frequency signal, may be used to interact with a mobile device of the user 112. For example, the wireless interface 110 may be configured to receive information identifying the user 112 and/or mobile device. This information may be used by the ticketing machine 100 to locate a user account associated with the user 112 and/or mobile device. In some embodiments, once identified, the ticketing machine 100 may retrieve preferences of the user 112, such as a preferred graphical user interface height that may be used to determine a vertical position of the projected graphical user interface 104. The wireless interface 104 may also allow the mobile device to submit payment information to the ticketing machine 100. For example, the mobile device (or smart card) may transmit a data file containing payment information associated with a payment account to the wireless interface 110. In some embodiments, the wireless interface 110 may be an NFC interface that a user's mobile device must be in close proximity to in order to submit payment information. In embodiments where the NFC reader is positioned within or behind the surface 106 (and therefore out of sight of the user 112), the graphical user interface 104 may include an icon that points out a location of the NFC interface. This directs the user 112 to position his mobile device near the icon to provide payment information. In embodiments with multiple wireless interfaces 110, the ticketing machine 100 may identify an available wireless interface 110 that is closest to the user 112 and/or the graphical user interface 104. The ticketing machine 100 may then adjust the graphical user interface 104 to produce an icon at that nearest interface 110. Similarly, the ticketing machine 100 may then designate that particular wireless interface 110 for use with that particular graphical user interface 104 until the user's interaction with the graphical user interface 104 is completed. In some embodiments, the wireless interface 110 may be used to provide access credentials, such as tickets or fares, on the user's mobile device. In such embodiments, the graphical user interface 104 may direct a user 112 to position his mobile device in proximity of the wireless interface 110 such that the credential(s) may be communicated to the mobile device. In other embodiments, such as those with account-based ticketing and access, the user may not need to interact with the wireless interface 110 to pay or to receive access credentials, as the ticketing machine 100 may utilize stored payment accounts to pay and/or add access accounts to an account associated with the user 112 an/or mobile device.

Ticketing machine 100 also includes at least one processor (not shown). The processor may be used to control the interactions between the various components of the ticketing machine 100 (image projection device 102, touch sensors, position sensors 108, wireless interface 110, and the like). For example, the processor may utilize data from the position sensors 108 and/or touch sensors to direct the image projection device 104 to project a particular screen of the graphical user interface 104 on the surface. The processor may correlate touch data and location data of the graphical user interface 104 to determine what selections a user 112 has made and what actions to perform based on the selections. In embodiments where a position of the projected graphical user interface 104 is customizable or otherwise movable, the processor may maintain a record of current positions of the graphical user interface(s) 104 and icons such that the processor can properly correlate touches with the correct selections by the user 112.

Figure 2:
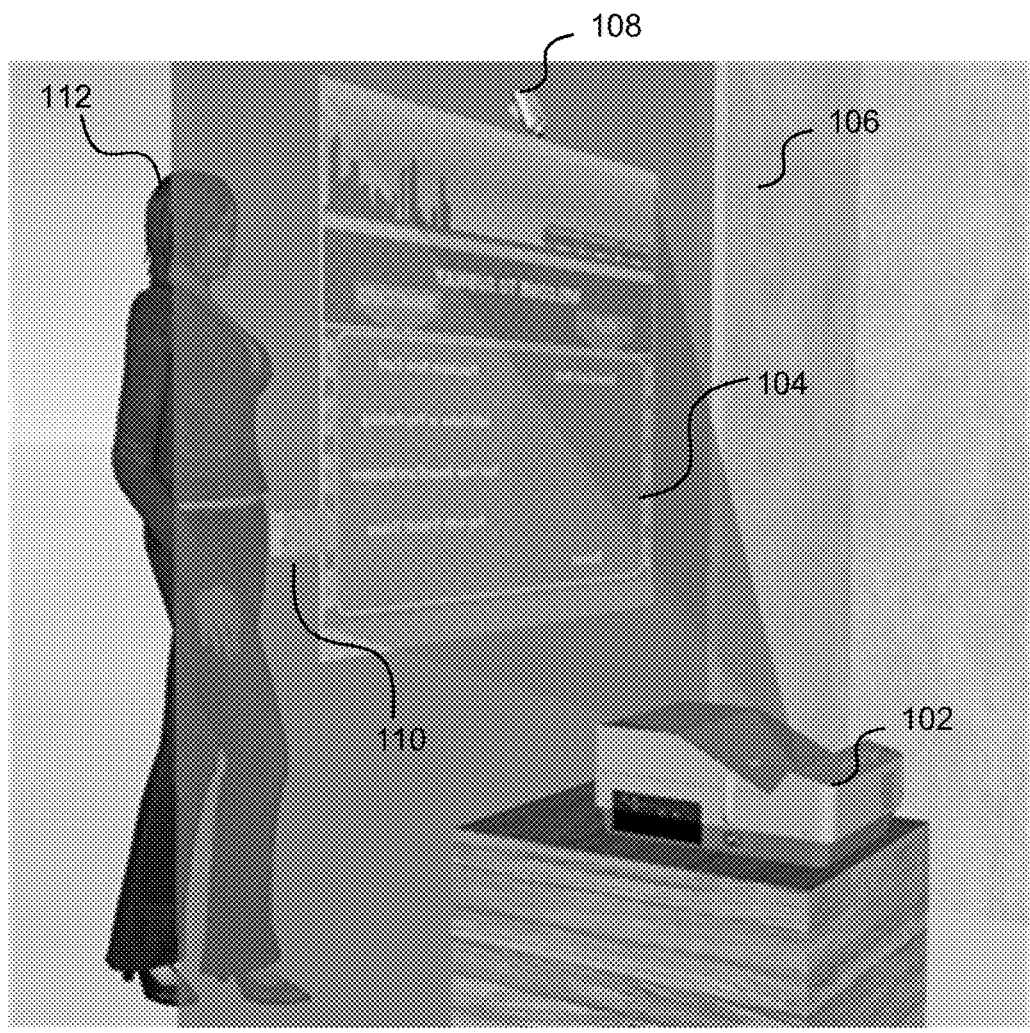
FIG. 2 depicts a rear view of the ticketing machine on a wall of FIG. 1 according to embodiments.

FIG. 2 shows a rear view of ticketing machine 100. Here, image projection device 102 is positioned entirely behind the surface 106. Image projection device 102 projects a reverse negative of the graphical user interface 104 such that from the rear of surface 106, the graphical user interface 104 is oriented in reverse. However, when viewed from a front of surface 106, the graphical user interface 104 is oriented properly for the user 112 to read the image, as shown in FIG. 1. While shown with image projection device 102 positioned on a box at a position below the graphical user interface 104, it will be appreciated that the image projection device 102 may be positioned at any height or angle relative to the graphical user interface 104. One advantage of this particular setup, with the image projection device 102 entirely behind the surface 106, is that users cannot move between the image projection device 102 and the surface 106. This ensures that the full graphical user interface 104 is displayed on the surface 106 at all times, with nothing to block the projected image. Additionally, the location of the image projection device 102 behind the surface 106 makes maintenance on the image projection device 102 easier, as a technician may work away from crowds.

Figure 3:
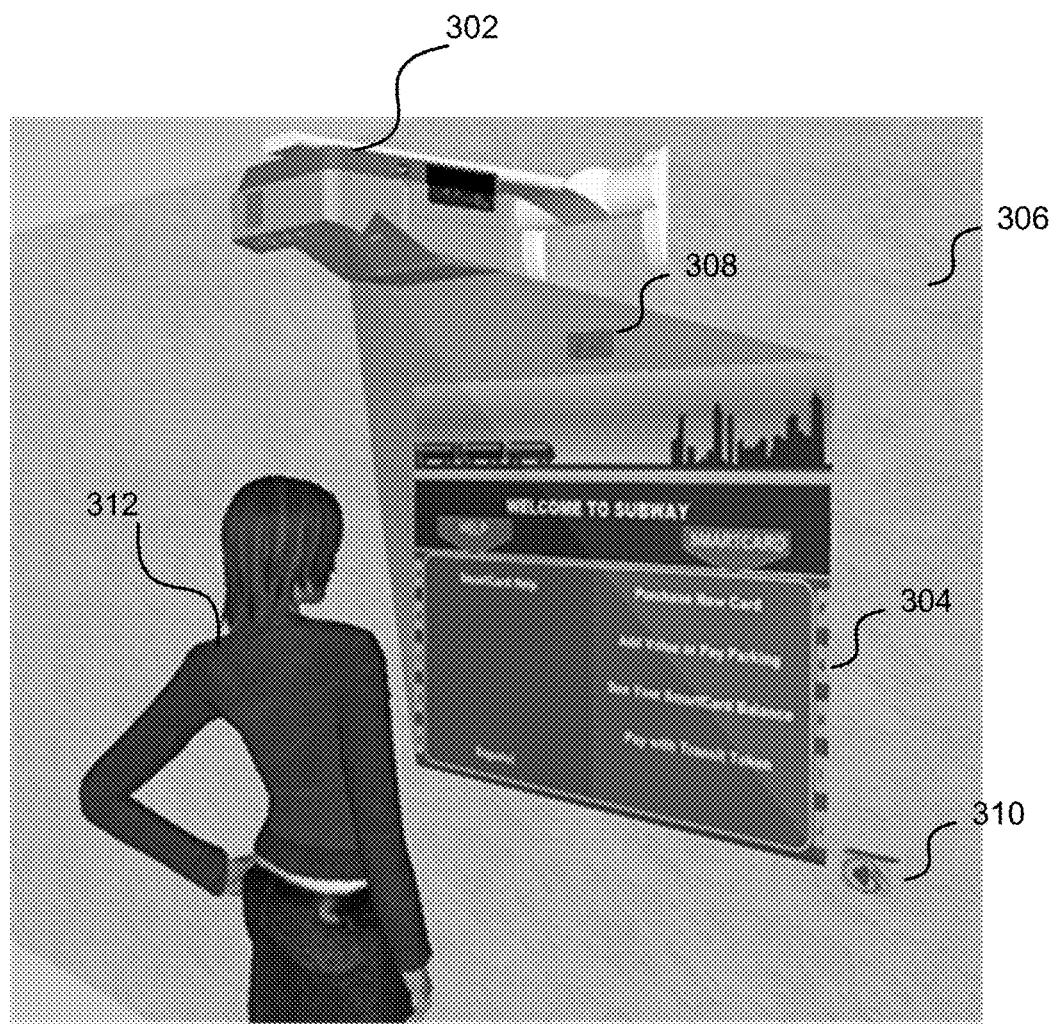
FIG. 3 depicts a front view of a ticketing machine on a wall according to embodiments.

FIG. 3 depicts another embodiment of a ticketing machine 300. Ticketing machine 300 may be similar to ticketing machine 100 and may include an image projection device 302 that is configured to project an image of a graphical user interface 304 on a surface 306. Ticketing machine 300 may also include one or more touch sensors (not shown) and at least one wireless interface 310. Here, image projection device 302 is positioned such that it projects an image of the graphical user interface 304 directly on a front of surface 306. For example, rather than being positioned behind the surface 306, image projection device 302 is positioned on a front/user side of the surface 306. In particular, image projection device 302 is mounted above a display position of the graphical user interface 304. For example, the image projection device 302 may be mounted to a ceiling or support beam extending above a user and/or surface 306. In other embodiments, the image projection device 302 may be mounted at a high position on the surface 306 itself. The image projection device 302 may be configured to project a properly oriented image of the graphical user interface 304 on a front of surface 306. Oftentimes, it is advantageous to mount the image projection device 302 at a position near the surface 306 such that the projected image is projected at a relatively severe angle relative to the surface 306, such as an angle achievable using an ultra-short throw projector, although the angle may be driven by a relative distance between the lens/laser of the image projection device 302 and the surface 306. By keeping the distance/angle adjusted in such a manner, the likelihood of a user's body passing between the lens/laser and the surface 306 may be minimized such that ability of the projected graphical user interface 304 to remain unbroken on the surface is maximized.

In some embodiments, the image projection device 302 may also act as its own touch sensor. For example, the image projection device may include an infrared projector and a monochrome complimentary metal-oxide semiconductor sensor (CMOS) (or other depth/motion sensors) that work together to "see" the room in three dimensions regardless of the lighting conditions in the area around the image projection device 302. In such embodiments, the image projection device 302 may utilize the CMOS and infrared projector to serve as its own touch sensor, with the CMOS and infrared projector acting together to serve as a depth sensor that can determine when a user touches the surface 306 to interact with the graphical user interface 304.

Ticketing machine 300 may provide a number of advantages. In particular, as noted above, the image projection device 302 may eliminate the need for additional touch sensors (although image projection device 302 may not include touch sensing capabilities and/or may still be used in conjunction with other touch sensors for enhanced accuracy), thereby reducing the necessary equipment and maintenance costs. Additionally, by mounting the image projection device 302 externally of the surface 306 it is easier to retrofit existing areas with a ticketing machine 300, while still eliminating the need for floor space to house a conventional ticketing machine. Moreover, since the image projection device 302 is configured to project the graphical user interface 304 directly onto a front of surface 306, any type of surface 306 may be used. There is no need to have a transparent surface 306 such as a glass wall or window. Instead, virtually any generally vertical surface 306 may be transformed into a touch surface for a ticketing device 302.

Figure 4:
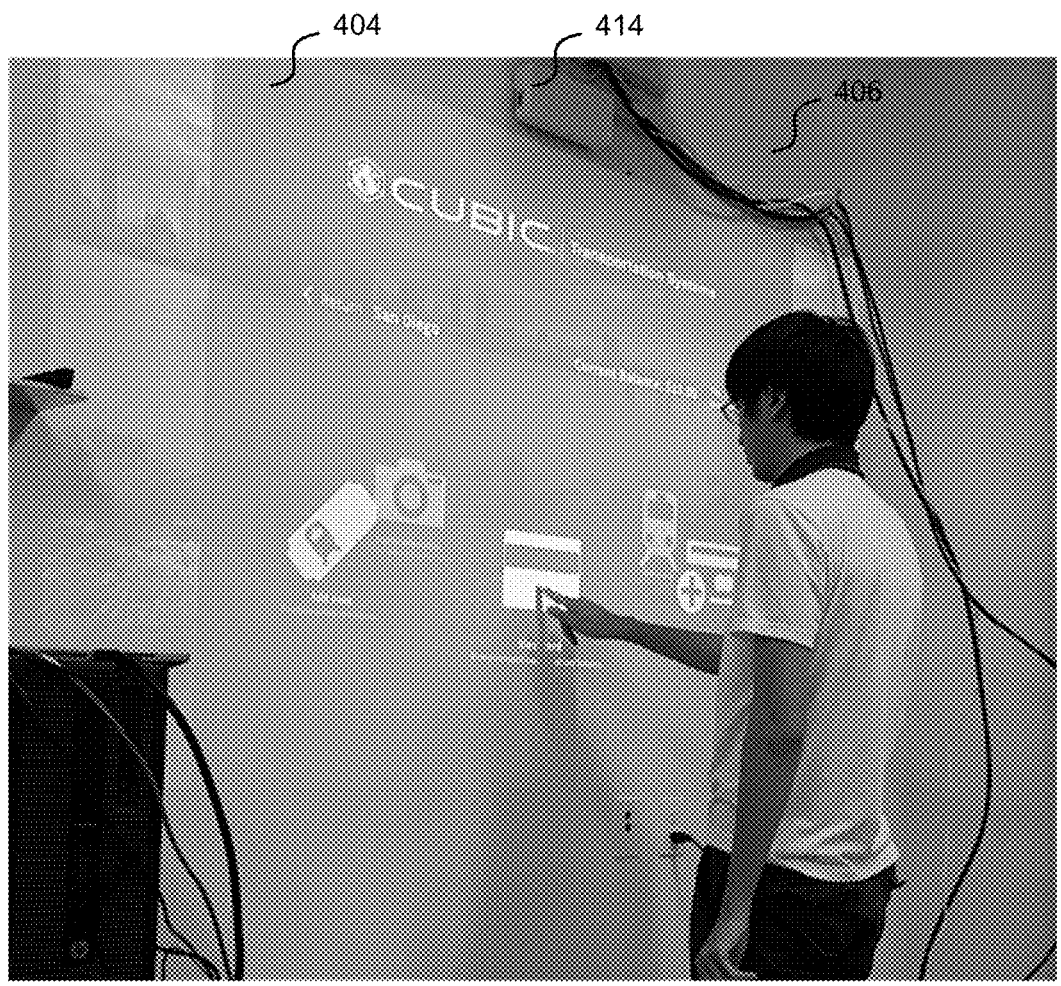
FIG. 4 depicts a front view of a ticketing machine on a wall according to embodiments.

FIG. 4 depicts another version of a ticketing machine 400. Ticketing machine 400 may be substantially similar to ticketing device 300. Here, ticketing device 400 is shown having an infrared sensor array 414 that acts as a touch sensor for determining how a user 412 is interacting with a graphical user interface 404 that is displayed by an image projection device (not shown). Here, the user 412 is touching an icon 416 provided on the graphical user interface 404. Infrared sensor array 414 detects a break in an infrared beam and is able to determine a location of the touch based on the break. A processor of the ticketing machine 400 may then match the location of the break with a location on the graphical user interface 404 to determine a selection associated with the user's touch.

Figure 5:
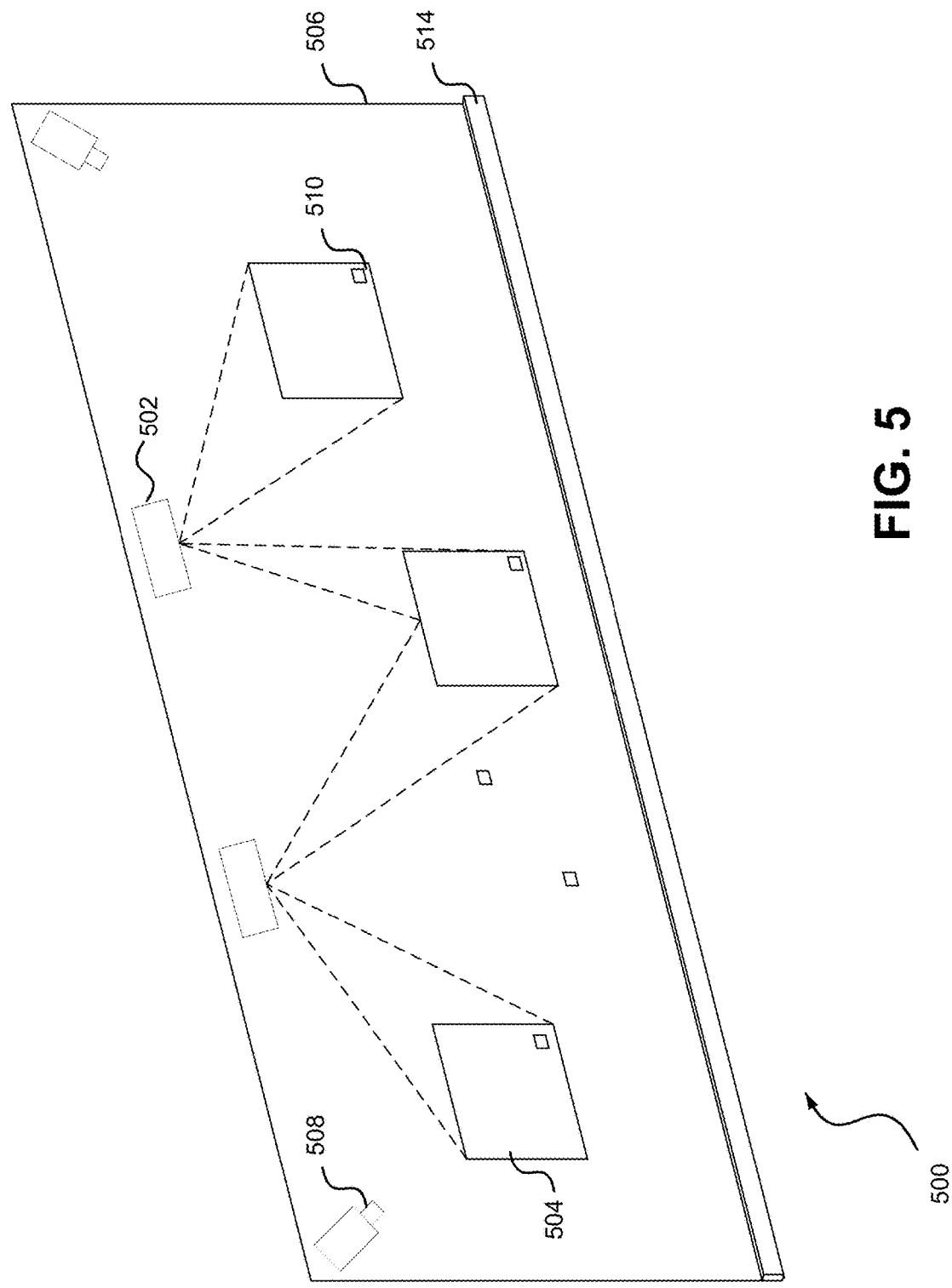
FIG. 5 depicts a front view of a ticketing system on a wall according to embodiments.

FIG. 5 depicts a ticketing system 500 according to one embodiment. Ticketing system 500 may include similar features as the ticketing machines described elsewhere herein. For example, ticketing system 500 may include one or more image projection devices 502. Each image projection device 502 may be similar to those described herein. For example, the image projection device(s) 502 may be positioned behind and/or in front of a surface 506, such as a wall, window, or other partition. In some embodiments, one or more image projection devices 502 may be positioned on a first side of a surface 506 while one or more image projection devices 502 may be positioned on an opposite side of the surface 506. The positioning of the image projection device(s) 502 may be driven by the particular needs and characteristics of the space containing the ticketing system 500. In some embodiments, each image projection device 502 may be configured to project images of one or more graphical user interfaces 504 onto a front of surface 504. For example, each image projection device 502 may be able to simultaneously project an entire graphical user interface 504 for one or more users onto the surface 506. In some embodiments, the position of a user may require a graphical user interface 504 to be positioned at a location that is not entirely accessible by the projection from a single image projection device 502. In such embodiments, a processing unit (including one or more processing devices) may determine that multiple image projection devices 502 must each project a portion of the graphical user interface 504 such that when viewed by a user, the combined projections cause a full graphical user interface 504 to be seen (and interacted with) by the user.

Image projection devices 502 may be configured to project graphical user interfaces at any vertical and/or lateral position along the surface 506 to accommodate any number of users of various sizes and or access needs (such as wheelchair bound users). The use of particular image projection devices 502 may vary between and/or during interactions with users. The processing unit may determine which single or combination of image projection devices 502 are needed to project all of the currently available graphical user interfaces 504 and issue commands that cause the available image projection devices 502 to project the necessary graphical user interfaces 504 and/or portions thereof. This may result in moving graphical interfaces 504 (such as those tracking the movement of a particular user) being switched between one or more different image projection devices 502 along the movement of the user, with multiple image projection devices 502 possibly being used at a single time at some points along a length of the surface 506.

In order to determine when and/or where a particular graphical user interface 504 is to be displayed, the ticketing system 500 may include one or more position sensors 508.

Here, a number of image capture devices, such as cameras, are spaced apart along a length of surface 506. These position sensors 506 may detect a current position of each user near the ticketing system 500. The current position may be used to determine when a graphical user interface 504 is first presented to the user, where (laterally and vertically) where the graphical user interface 504 is presented relative to the surface 506, and which image projection device(s) 502 is needed to project the graphical user interface 504. In embodiments where the position sensors 508 include one or more cameras, the position sensors may also be used to identify the particular user. It will be appreciated that while shown with cameras, ticketing system 500 may utilize any other position sensors disclosed herein.

Ticketing system 500 may also include a number of wireless interfaces 510, such as NFC or other RF readers. These wireless interfaces may be configured to communicate identification, payment, credential, and/or other data between the ticketing system 500 and a user's mobile device. Oftentimes, the wireless interfaces 510 may be embedded within or positioned behind the surface 506. In such embodiments, the user interfaces 504 may include icons that direct users as to the location of a wireless interface 510 to use in conjunction with a particular interaction. In other embodiments, especially in retrofit applications) the wireless interfaces 510 may be mounted on the surface 506 and a user may readily identify and use the wireless interface 510.

Ticketing system 500 may also include one or more touch sensors 514. As shown here, an infrared array is provided at a base of the surface 506. The infrared array may be used to detect when a user touches and/or otherwise interacts with a graphical user interface 504. For example, the infrared array may detect a break in an infrared beam emitted by the array and be able to determine a location of the user's touch. The processing unit may then determine a location associated with a particular graphical user interface 504 that corresponds with the touch and uses this information to determine an input or other selection intended by the user. While described using an infrared array as touch sensor 514, it will be appreciated that any one or more of the touch sensors described in relation with other embodiments may be utilized as touch sensor 514.

In some embodiments, a ticketing machine or system may include one or more touchscreens that are mounted on or within a particular surface. For example, one or more touchscreen monitors may be embedded in a surface. Each monitor may display a graphical user interface and/or may include its own wireless interface. If the monitor is large enough, such as a monitor that takes up a large portion of a wall or window, the monitor may be used to display one or more graphical user interfaces at various points on its surface. This allows the lateral and vertical position of a graphical user interface to be adjusted as done in other embodiments. The touchscreen may include its own touch sensors and my include or be in communication with one or more position sensors that may be used to determine when and where a graphical user interface should be presented.

Figure 6:
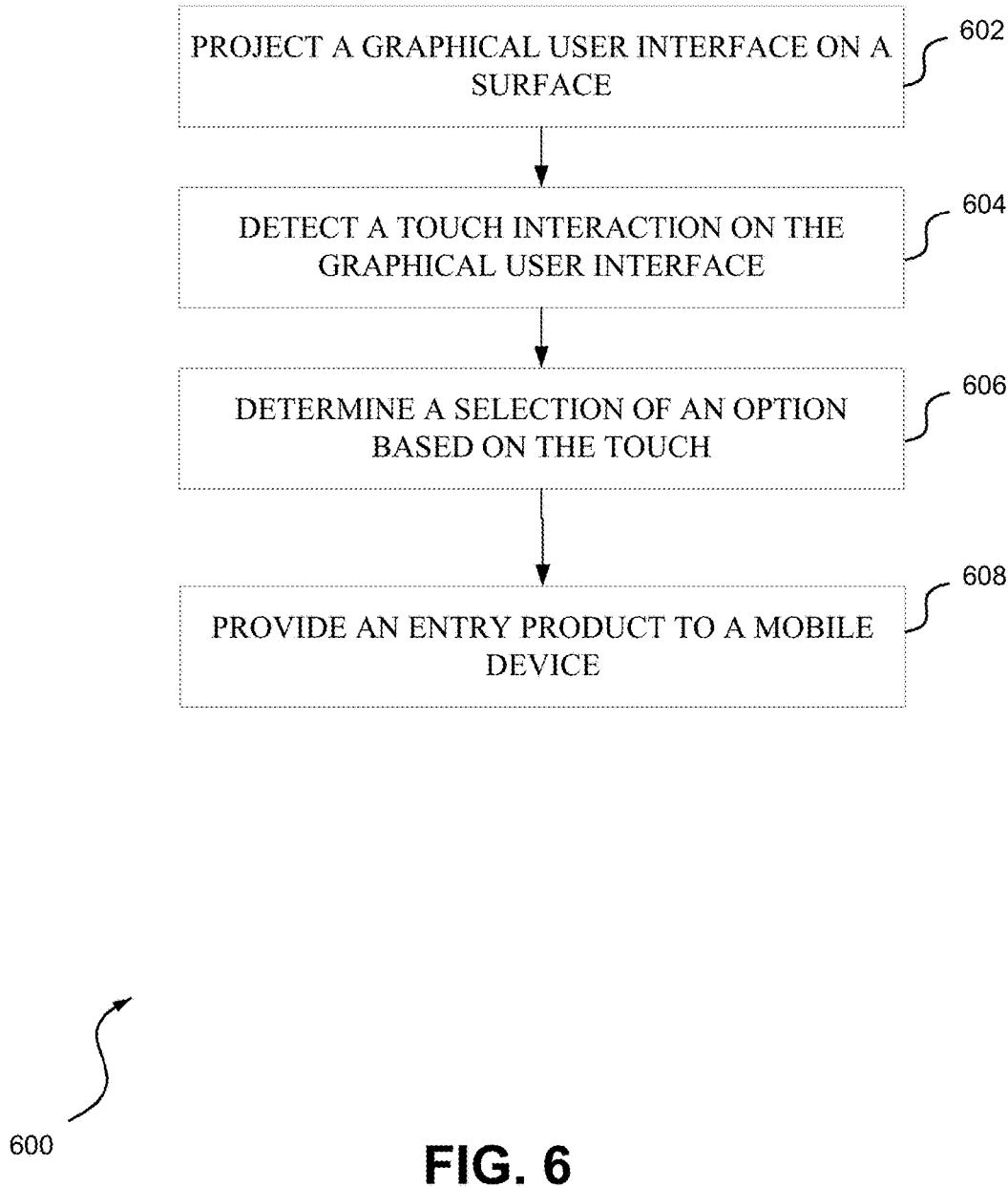
FIG. 6 is a flowchart illustrating a method of operating a ticketing machine on a wall according to embodiments.

FIG. 6 is a flowchart depicting a process 600 for operating a ticketing machine on a wall according to one embodiment. Process 600 may be performed using any of the ticketing machines/systems described herein. In some embodiments, process 600 may begin at block 602 by projecting a user interface of the ticketing machine on a surface. The image may be projected from a front and/or a rear of the surface (which may be a wall, window, or other partition) and may be projected using one or more image projection devices. In some embodiments, a height of the user of the ticketing machine may be detected. This may be done using one or more position sensors (such as cameras) and/or using the image projection device itself (such as when the image projection device includes an infrared sensor). Based on the height of the user, a vertical position of the projected graphical user interface may be adjusted or set based on the detected height. In some embodiments, the lateral position of a user relative to the surface may be detected using the position sensors. A position of the projection of the graphical user interface of the ticketing machine may be set or adjusted based at least in part on the lateral position of the user. In some embodiments, the lateral position of the user may be continually tracked. In such embodiments, the image projection device may adjust a position of the projected graphical user interface based on the tracked lateral position of the user. This allows the graphical user interface to follow and track the user if the user moves relative to the surface.

At block 604, a touch interaction of a user of the ticketing machine may be detected on the graphical user interface that is projected on the surface. This touch interaction may be detected using one or more touch sensors, such as an infrared array, touch foil surface, vibrations sensors, touchscreens, the image projection device itself, and/or combinations thereof. For example, when the touch sensor includes an infrared array, touch detection involves detecting a break in an infrared signal emitted by an infrared sensor, determining a location of the touch interaction based on a distance of the break from the infrared sensor and a position of the infrared sensor relative to the surface, and correlating the location of the touch interaction with an icon of the graphical user interface. As another example, when the touch sensor includes a touch foil surface, touch detection involves detecting physical contact at a location of a touch foil surface and correlating the location of the touch interaction with an icon of the graphical user interface. It will be appreciated that other touch sensors may be used and/or a number of touch sensors may be used and data from each compared to determine a user's selection.

At block 606, a selection of an option of the user is determined based on the detected touch interaction. After each touch and selection is determined the ticketing machine may determine a proper action to take. In some cases this may involve projecting an image of a new screen of the graphical user interface to provide the user with new information, instructions, and/or options. In other embodiments, the ticketing machine may determine that an entry product, such as a fare, ticket, and/or other access credential, is to be provided to the user. At block 608, the entry product may be wirelessly provided to a mobile device of the user based on the selected option, such as by using an NFC interface and/or other RF signal. Similarly, receipts and other data may be transmitted to the mobile device using the wireless interface. It will be appreciated that in some embodiments, such as those using account-based ticketing, the entry product may be added to an account associated with the user's mobile device, rather than providing the entry product directly to the mobile device itself.

Figure 7:
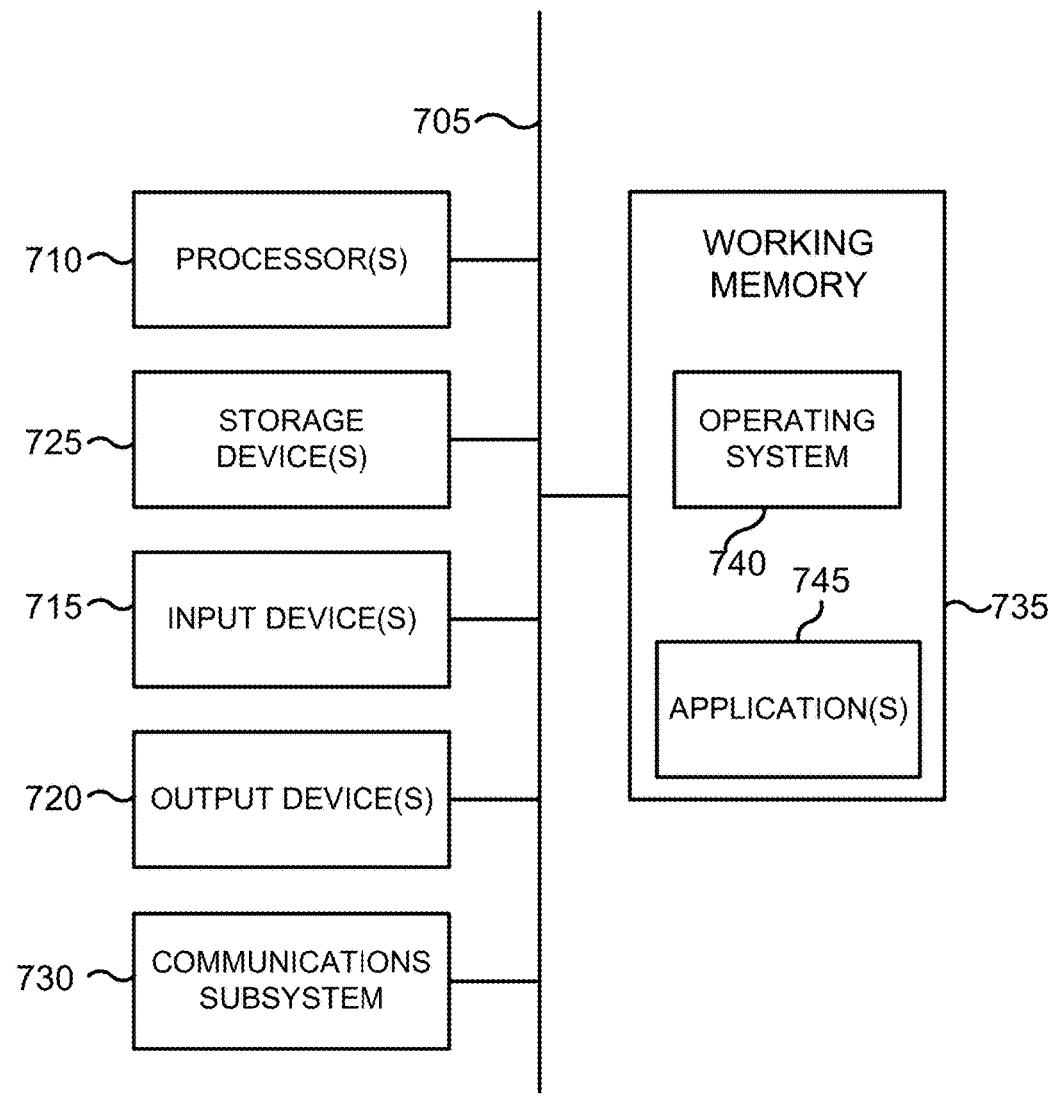
FIG. 7 is a block diagram of a computer system according to embodiments.

A computer system as illustrated in FIG. 7 may be incorporated as part of the previously described computerized devices. For example, computer system 700 can represent some of the components of the ticketing machines/systems, image projection devices, position sensors, touch sensors, wireless interfaces, mobile devices, remote computing devices, and the like described herein. FIG. 7 provides a schematic illustration of one embodiment of a computer system 700 that can perform the methods provided by various other embodiments, as described herein. FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include a processing unit 710, including without limitation one or more processors, such as one or more special-purpose processors (such as digital signal processing chips, graphics acceleration processors, and/or the like); one or more input devices 715, which can include without limitation a keyboard, a touchscreen, receiver, a motion sensor, a camera, a smartcard reader, a contactless media reader, and/or the like; and one or more output devices 720, which can include without limitation a display device, a speaker, a printer, a writing module, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communication interface 730, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 730 may permit data to be exchanged with a network (such as the network described below, to name one example), other computer systems, and/or any other devices described herein. In many embodiments, the computer system 700 will further comprise a non-transitory working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 710, applications 745, etc.) Further, connection to other computing devices such as network input/output devices may be employed.

Some embodiments may employ a computer system (such as the computer system 700) to perform methods in accordance with the disclosure. For example, some or all of the procedures of the described methods may be performed by the computer system 700 in response to processing unit 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processing unit 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processing unit 710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 725. Volatile media include, without limitation, dynamic memory, such as the working memory 735. Transmission media include, without limitation, coaxial cables, copper wire, and fiber optics, including the wires that comprise the bus 705, as well as the various components of the communication interface 730 (and/or the media by which the communication interface 730 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a non-transitory storage device 725 either before or after execution by the processing unit 710.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A ticketing machine on a wall, the ticketing machine comprising:
   an image projection device;
   a touch sensor;
   an image capture device;
   a wireless interface that is configured to communicate with a user's mobile device; and
   a processor configured to:
      project, using the projector, a graphical user interface of the ticketing machine on a surface;
      continually track, using the image capture device, a lateral position of the user relative to the surface;
      adjust a position of an entirety of the projected graphical user interface based on the lateral position of the user;
      detect, using the touch sensor, a touch interaction of a user of the ticketing machine on the graphical user interface that is projected on the surface after the position of the entirety of the projected graphical user interface has been adjusted;
      determine a selection of an option of the user based on the detected touch interaction; and
      provide, using the wireless interface, an entry product to a mobile device of the user based on the selected option.

2. The ticketing machine on a wall of claim 1, wherein: the touch sensor comprises a touch foil surface.

3. The ticketing machine on a wall of claim 1, wherein: the touch sensor comprises an infrared array.

4. The ticketing machine on a wall of claim 1, wherein: the image projection device is positioned rearward of the surface; and
   the surface is transparent.

5. The ticketing machine on a wall of claim 1, wherein: the wireless interface is positioned entirely behind the surface.

6. A ticketing machine on a wall, the ticketing machine comprising:
   an image capture device;
   an image projection device;
   a touch sensor;
   a wireless interface that is configured to communicate with a user's mobile device; and
   a processor configured to:
      detect, using the image capture device, a position of a user;
      project, using the projector, a graphical user interface of the ticketing machine on a surface, wherein a position of the graphical user interface is based on the detected position of the user;
      continually track, using the image capture device, a lateral position of the user relative to the surface;
      adjust a position of an entirety of the projected graphical user interface based on the lateral position of the user;

detect, using the touch sensor, a touch interaction of a user of the ticketing machine on the graphical user interface that is projected on the surface after the position of the entirety of the projected graphical user interface has been adjusted;

determine a selection of an option of the user based on the detected touch interaction; and provide, using the wireless interface, an entry product to a mobile device of the user based on the selected option.

7. The ticketing machine on a wall of claim 6, wherein:
the touch sensor comprises an infrared array; and
detecting the touch interaction comprises:
  detecting a break in an infrared signal emitted by the infrared array;
  determining a location of the touch interaction based on a distance of the break from the infrared array and a position of the infrared array relative to the projected graphical user interface; and
  correlating the location of the touch interaction with an icon of the graphical user interface.

8. The ticketing machine on a wall of claim 6, wherein:
the touch sensor comprises a touch foil surface; and
detecting the touch interaction comprises:
  detecting physical contact at a location of the touch foil surface; and
  correlating the location of the touch interaction with an icon of the graphical user interface.

9. The ticketing machine on a wall of claim 6, wherein the processor is further configured to:
  detect, using the image capture device, a height of the user; and
  adjust a height of the projected graphical user interface based on the detected height.

10. The ticketing machine on a wall of claim 6, wherein:
the image projection device is positioned rearward of the surface; and
the surface is transparent.

11. A method for operating a ticketing machine on a wall, the method comprising: projecting a graphical user interface of the ticketing machine on a surface; continually tracking a lateral position of the user relative to the surface; adjusting a position of an entirety of the projected graphical user interface based on the lateral position of the user; detecting a touch interaction of a user of the ticketing machine on the graphical user interface that is projected on the surface after the position of the entirety of the projected graphical user interface has been adjusted; determining a selection of an option of the user based on the detected touch interaction; and wirelessly providing an entry product to a mobile device of the user based on the selected option.

12. The method for operating a ticketing machine on a wall of claim 11, wherein:
  detecting the touch interaction comprises detecting a break in an infrared signal emitted by an infrared sensor;
  determining a location of the touch interaction based on a distance of the break from the infrared sensor and a position of the infrared sensor relative to the surface; and
  correlating the location of the touch interaction with an icon of the graphical user interface.

13. The method for operating a ticketing machine on a wall of claim 11, wherein:
  detecting the touch interaction comprises detecting physical contact at a location of a touch foil surface; and
  correlating the location of the touch interaction with an icon of the graphical user interface.

14. The method for operating a ticketing machine on a wall of claim 11, further comprising:
  detecting a height of the user; and
  adjusting a height of the projected graphical user interface based on the detected height.

15. The method for operating a ticketing machine on a wall of claim 11, further comprising:
  detecting a lateral position of the user relative to the surface, wherein projecting the user interface of the ticketing machine on the surface comprises projecting the graphical user interface on at a position on the surface based at least in part on the lateral position of the user.

16. The method for operating a ticketing machine on a wall of claim 11, wherein:
  the graphical user interface is projected onto a rear surface of the surface.

* * * * *